United States Patent
Das

(10) Patent No.: US 8,046,475 B2
(45) Date of Patent: Oct. 25, 2011

(54) PORTABLE COMMUNICATION TERMINAL APPARATUS, COMMUNICATION SYSTEM AND NETWORK ADDRESS SETTING METHOD THEREOF

(75) Inventor: Kumar Brata Das, Suwonshi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 326 days.

(21) Appl. No.: 11/849,498

(22) Filed: Sep. 4, 2007

(65) Prior Publication Data
US 2008/0147832 A1 Jun. 19, 2008

(30) Foreign Application Priority Data
Dec. 19, 2006 (KR) .................. 10-2006-0130411

(51) Int. Cl.
*G06F 15/16* (2006.01)
(52) U.S. Cl. ............... 709/228; 709/227; 709/229
(58) Field of Classification Search .......... 709/225–229, 709/217–219; 455/455.4, 41.2–41.3
See application file for complete search history.

(56) References Cited

U.S. PATENT DOCUMENTS

| | | | | |
|---|---|---|---|---|
| 5,778,172 A * | 7/1998 | Riedle et al. | | 726/9 |
| 6,308,281 B1 * | 10/2001 | Hall et al. | | 714/4 |
| 7,113,130 B2 * | 9/2006 | Zukowski et al. | | 342/451 |
| 7,119,701 B2 * | 10/2006 | Browning | | 709/225 |
| 2002/0032780 A1 * | 3/2002 | Moore et al. | | 709/228 |
| 2003/0065753 A1 * | 4/2003 | Taninaka et al. | | 709/220 |
| 2004/0114601 A1 * | 6/2004 | Watanabe et al. | | 370/395.2 |
| 2005/0018677 A1 * | 1/2005 | Lee et al. | | 370/389 |
| 2005/0033721 A1 * | 2/2005 | Cromer et al. | | 707/1 |
| 2005/0055578 A1 * | 3/2005 | Wright et al. | | 713/201 |
| 2006/0203282 A1 * | 9/2006 | Iwai | | 358/1.15 |
| 2007/0038438 A1 * | 2/2007 | Cho et al. | | 704/9 |
| 2007/0185980 A1 * | 8/2007 | Abraham et al. | | 709/222 |
| 2008/0014966 A1 * | 1/2008 | Chakraborty et al. | | 455/456.4 |
| 2008/0299966 A1 * | 12/2008 | Masuda | | 455/432.1 |
| 2009/0238203 A1 * | 9/2009 | Chen et al. | | 370/463 |

FOREIGN PATENT DOCUMENTS

| | | |
|---|---|---|
| JP | 6-216920 | 8/1994 |
| KR | 1997-705890 | 10/1997 |
| KR | 2003-83785 | 11/2003 |

OTHER PUBLICATIONS

CN Office Action issued Aug. 3, 2011 in CN Patent Application No. 2007101635558.

* cited by examiner

Primary Examiner — Brendan Higa
(74) Attorney, Agent, or Firm — Stanzione & Kim, LLP

(57) ABSTRACT

A portable communication terminal apparatus which is connected to a router through a cable includes a storage which stores a plurality of allocated Internet Protocol (IP) addresses, a detector which detects information on the cable connected to the router, and an address setting part which sets one of the plurality of IP addresses as a network IP address based on the detected information on the cable.

24 Claims, 5 Drawing Sheets

PORTABLE COMMUNICATION TERMINAL APPARATUS, COMMUNICATION SYSTEM AND NETWORK ADDRESS SETTING METHOD THEREOF

CROSS-REFERENCE TO RELATED APPLICATIONS

This application claims priority from Korean Patent Application No. 10-2006-0130411, filed on Dec. 19, 2006 in the Korean Intellectual Property Office, the disclosure of which is incorporated herein by reference in its entirety.

BACKGROUND OF THE INVENTION

1. Field of the Invention

The present general inventive concept relates to a portable communication terminal apparatus and communication system, and more particularly, to a portable communication apparatus and communication system which automatically set a network address in an internet environment in which the portable communication apparatus is frequently moved, and a setting method of the network address thereof.

2. Description of the Related Art

Generally, an Internet Protocol (IP) address is a unique identifiable address which is provided in an every communication network connected to the Internet and a communication terminal apparatus connected to the communication network. The IP address is distinguished into A, B and C grades according to the number of computers connected to the communication network, in other words, the size of the communication network and it is distinguished by the number of bits of a part that indicates an address of the communication network and a part that indicates the address of the communication terminal apparatus connected to the communication network.

Accordingly, a user has to set an address corresponding to a connection location so as to connect the communication terminal apparatus to the Internet. Therefore, a portable communication terminal apparatus has to newly reset the IP address to connect to the Internet whenever the portable communication terminal apparatus is moved.

Currently, the user needs to set information on the IP address, a subnet mask, a router address and a Domain Name System (DNS) server in the communication terminal apparatus to be connected to the Internet. Some portable communication terminal apparatuses automatically set the network address through a Dynamic Host Configuration Protocol (DHCP) server so as not to set the IP address passively. However, there are other portable communication terminal apparatuses which do not use the DHCP server because of problems of security and so on. In this case, the other portable communication terminal apparatuses have to be set with the IP address whenever they are moved.

SUMMARY OF THE INVENTION

The present general inventive concept provides a portable communication terminal apparatus and communication system which are capable of automatically setting a network address in an Internet environment in which the portable communication terminal apparatus is frequently moved and a network address setting method thereof.

The present general inventive concept provides a portable communication terminal apparatus and communication system which are capable of setting the network address by using information of a cable.

Additional aspects and utilities of the present general inventive concept will be set forth in part in the description which follows and, in part, will be obvious from the description, or may be learned by practice of the present general inventive concept.

The foregoing and/or other aspects of the present general inventive concept can be achieved by providing a portable communication terminal apparatus which is connected to a router through a cable, the apparatus comprising a storage which stores a plurality of allocated Internet Protocol (IP) addresses, a detector which detects information on the cable connected to the router, and an address setting part which sets one of the plurality of IP addresses as a network IP address based on the detected information on the cable.

The detector may detect identifying information attached to the cable as the information on the cable.

The detector may comprise a Radio Frequency Identification reader which is capable of reading an attached wireless IC tag as the identifying information.

In the portable communication terminal apparatus, the detector may measure a length of the cable as the information on the cable.

The detector may detect a Media Access Control address of the router as the information on the cable.

The detector may detect whether the cable is connected to the router.

The storage may store a table comprising the information on the cable and the Internet Protocol address corresponding to the cable.

The table stored in the storage may further comprise a router address, and the apparatus may further comprise a router address processor which processes whether the connected router address is identical to one of the stored router addresses if the cable is connected between the router and the portable communication terminal apparatus.

The address setting part may set the network IP address corresponding to the information on the detected cable, if the connected router address is identical to one of the stored router addresses and the detected information on the cable is stored.

The address setting part may output a setting screen to receive a new IP address if the connected router address is not identical at least one of the stored router addresses.

The foregoing and/or other aspects of the present general inventive concept may also be achieved by providing a communication system which connects a router and a portable communication terminal apparatus through a cable, wherein the portable communication terminal apparatus comprises a storage which stores a plurality of allocated Internet Protocol (IP) addresses, a detector which detects information on the cable connected to the router, and an address setting part which sets one of the plurality of IP addresses as a network IP address based on the detected information on the cable.

The foregoing and/or other aspects of the present general inventive concept may also be achieved by providing a network address setting method of a portable communication terminal apparatus connected to a router through a cable, the method comprising storing a plurality of allocated Internet Protocol (IP) addresses, detecting information on the cable connected to the router, and setting one of the plurality of IP addresses as a network IP address based on the detected information on the cable.

The detecting may comprise detecting identifying information attached to the cable as the information on the cable.

The detecting may comprise measuring a length of the cable as the information on the cable.

The detecting may comprise a Media Access Control address of the router as the information on the cable.

The detecting may comprise detecting whether the cable is connected to the router.

The storing may comprise storing a table comprising the information on the cable and the IP address corresponding to the cable.

The storing may further comprise storing a router address, and processing whether the connected router address is identical to one of the stored router addresses if the cable is connected between the router and the portable communication terminal apparatus.

The setting as the network IP address may comprise setting the network IP address corresponding to the information on the detected cable if the connected router address is identical to one of the stored router addresses and the detected information of the cable is stored.

The setting as the network IP address may comprise outputting a setting screen to receive a new IP address if the connected router address is not identical to at least one of the stored router addresses.

The foregoing and/or other aspects of the present general inventive concept may also be achieved by providing a network address setting method of a communication system comprising a router and a portable communication terminal apparatus, the method comprising storing a plurality of allocated Internet Protocol (IP) addresses in the portable communication terminal apparatus, connecting the router and the portable communication terminal apparatus by the cable, and detecting information on the cable connected to the router, and setting one of the plurality of IP addresses as a network IP address based on the detected information on the cable.

The foregoing and/or other aspects of the present general inventive concept may also be achieved by providing a portable communication terminal apparatus usable with a communication system, the apparatus including a detector which detects information on an external cable, and a controller which sets a network IP address according to the detected information on the cable and a plurality of reference allocated Internet Protocol addresses.

The portable communication terminal apparatus may further include a housing to accommodate the detector and the controller, and an adapter disposed on the housing to be connected to the external cable to read the information on the external cable.

The portable communication terminal apparatus may further include a user interface unit disposed in the housing and having a display and a user input part to display a screen and to input data using the displayed screen to correspond to at least one of the plurality of reference allocated Internet Protocol addresses.

The external cable may be connectable to one of a first router and a second router; and the detector detect the information on a first router address when the external cable is connected to the first router, and detects the information on a second router address when the external cable is connected to the second router.

The controller may set a new network IP address as the network IP address when the detected information on the cable does not match at least one of the plurality of reference allocated Internet Protocol addresses.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
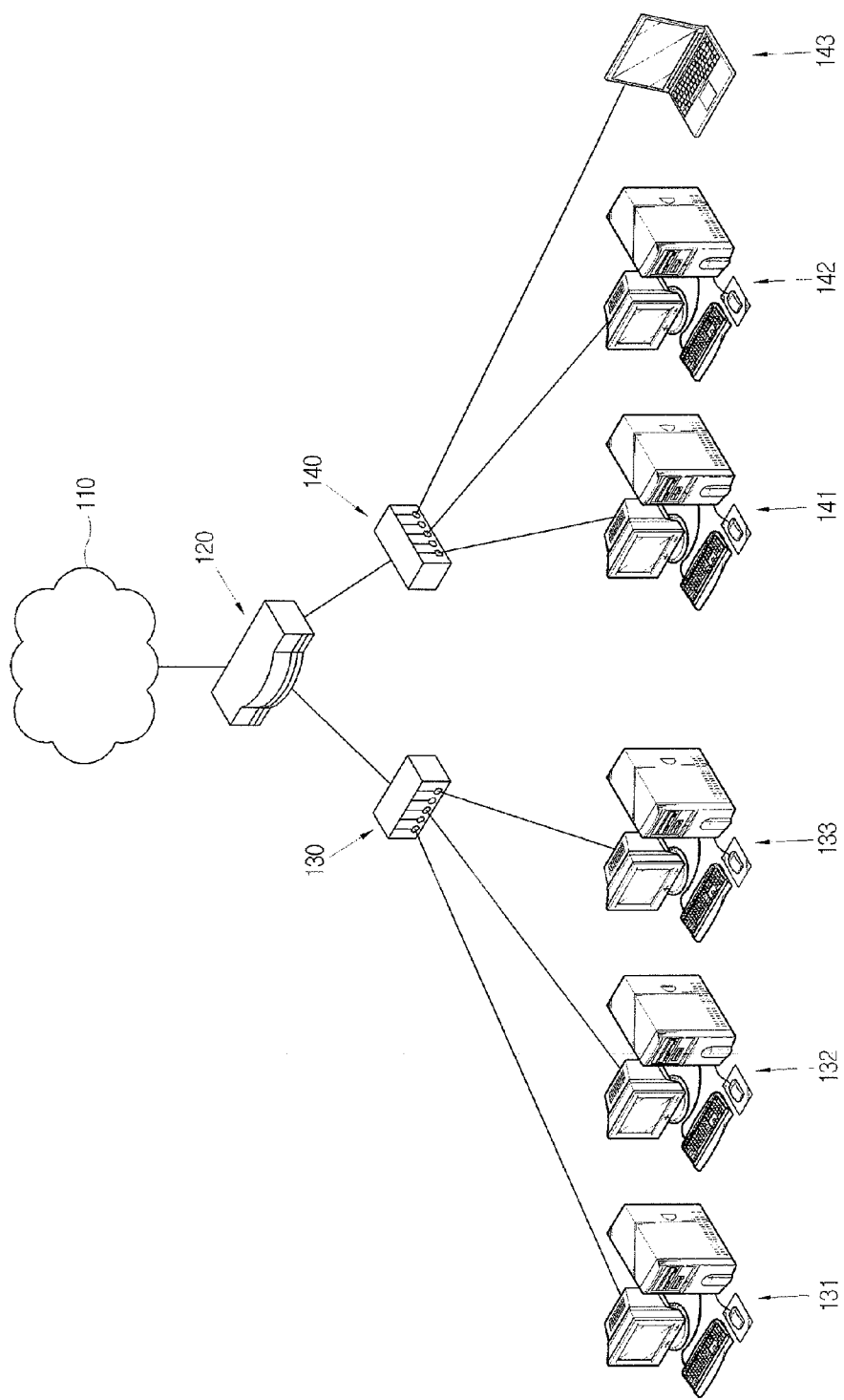
FIG. 1 illustrates a current network environment according to an embodiment of the present general inventive concept.

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

As illustrated in FIG. 1, a communication system in a network environment applied to the present embodiment comprises a router 120, a hub A 130, a hub B 140, and a plurality of communication terminal apparatuses, such as a communication terminal apparatus A 131, a communication terminal apparatus B 132, a communication terminal apparatus C 133, a communication terminal apparatus D 141, a communication terminal apparatus E 142 and a portable communication terminal apparatus F 143. The communication terminal apparatus A 131, the communication terminal apparatus B 132 and the communication terminal apparatus C 133 are respectively connected to the hub A 130, and selectively connected to the router 120 by a switching operation of the hub A 130 through a wired or wireless communication. Also, the communication terminal apparatus A 131, the communication terminal apparatus B 132 and the communication terminal apparatus C 133 are connected to an external network such as an Internet network 110 by a routing operation of the router 120. Therefore, the router 120 may be a gateway having the routing function. It is possible that the router 120 may have the switching function of the hubs A or B 130 and 140.

The plurality of communication terminal apparatuses in the network each comprises a network address to identify itself. Here, the network address representatively comprises an IP address. The IP address comprises a subnet address indicating an address of a communication network and a host number indicating a number of the communication terminal apparatus connected in the subnet address.

The plurality of communication terminal apparatuses, in other words, the communication terminal apparatus A 131, communication terminal apparatus B 132, communication terminal apparatus C 133, communication terminal apparatus D 141, communication terminal apparatus E 142 and portable communication terminal apparatus F 143 which are connected to an external internet network 110 through routing of the router 120 form one subnet and have the same subnet address.

Figure 2:
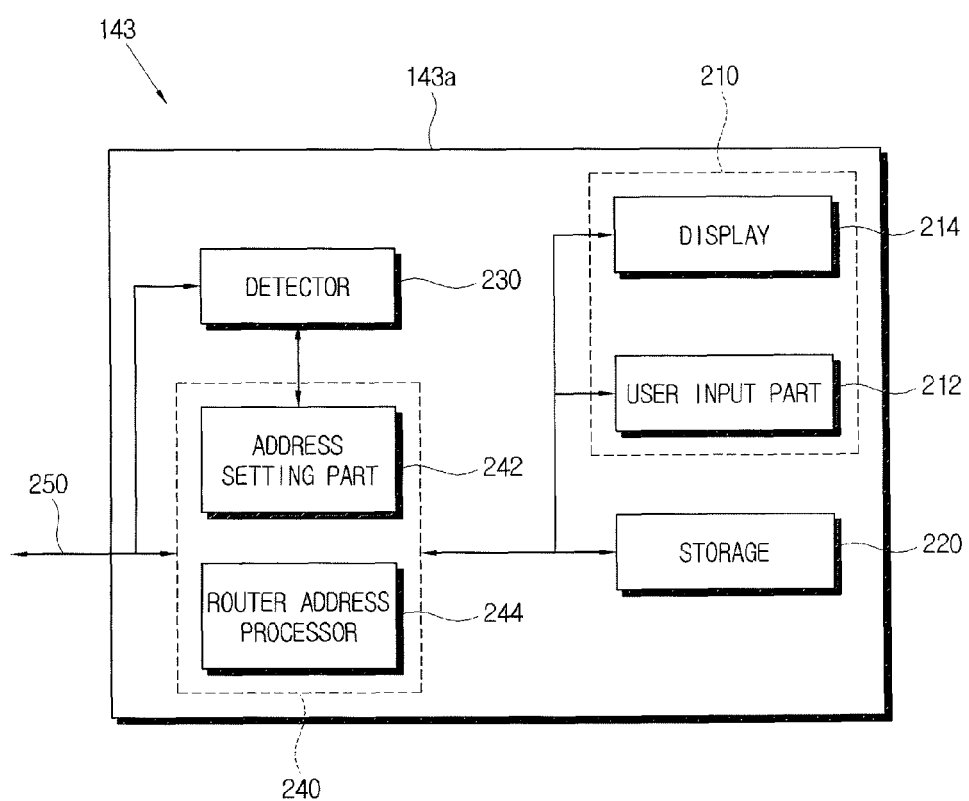
FIG. 2 illustrates a configuration of a portable communication terminal apparatus according to an exemplary embodiment of the present general inventive concept.

As illustrated in FIG. 2, the portable communication terminal apparatus 143 comprises a User Interface (UI) part 210, a storage 220, a detector 230 and a controller 240, and may also have a housing 143a to accommodate components thereof, for example, the UI part 210, the storage 220, the detector 230 and the controller 240.

The UI part 210 displays and receives the IP address, a subnet mask, a router address and a DNS server address to be connected to the Internet network 110, and comprises a user input part 212 and a display 214.

The user input part 212 comprises a keyboard, a touch panel and other known input devices in the art. The portable communication terminal apparatus 143 is inputted information related to connection to the Internet network 110 and the IP address used in the Internet network 110 by a user through the user input part 212.

The display 214 displays input items related to the IP address, the subnet mask, the router address and the DNS server address for the user through a user interface screen displayed thereon. The user inputs information to the respective input items displayed on the display 214 through the user input part 212.

The storage 220 stores the information on the IP address, the subnet mask, the router address and the DNS server address inputted through the user input part 212. In other words, the storage 220 stores the information on the IP address, the subnet mask, the router address and the DNS server address in one record as Internet connection information.

The detector 230 detects whether a cable 250 is connected between the router 120 and the portable communication terminal apparatus 143, and detects information on the cable 250 connected to the router 120 or the hub B 140.

Figure 3:
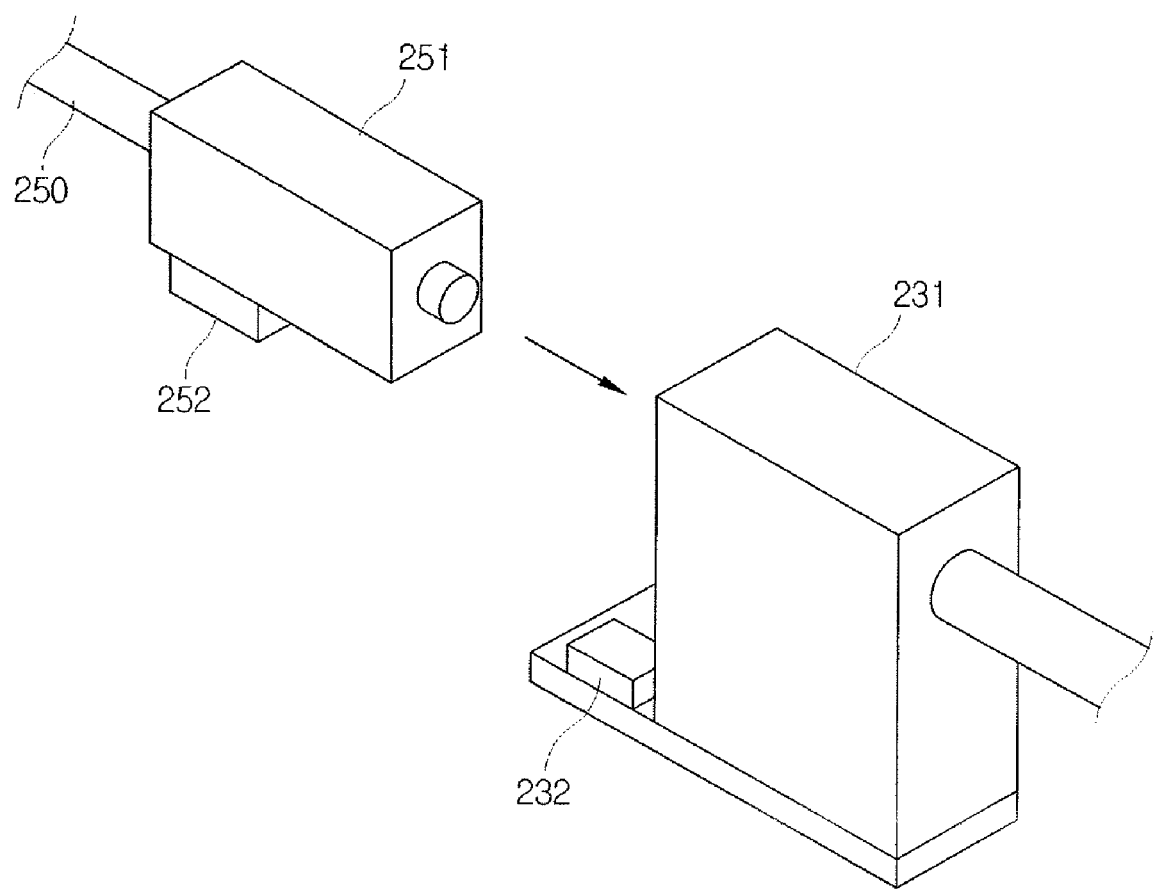
FIG. 3 illustrates an example detecting information of a cable in a detector of FIG. 2.

FIG. 3 illustrates an example that detects the information on the cable 250. Here, cable identifying information attached to the cable 250 can be used as the information on the cable 250. Table 1 shows the IP address and the cable identifying information corresponding to the IP address.

TABLE 1

| Cable identifying information | IP address |
|---|---|
| C2 | 10.0.0.2 |
| C3 | 10.0.0.3 |
| C4 | 10.0.0.4 |

In the table 1, set are the C2, C3 and C4 as an example of the cable identifying information and the corresponding IP addresses are given as '10.0.0.2', '10.0.0.3' and '10.0.0.4'.

FIG. 3 illustrates the cable 250 and an adaptor 231 as the example detecting the information on the cable 250 in the detector 230 of FIG. 2. The adaptor 231 shown in FIG. 3 is provided in the portable communication terminal apparatus 143 to be connected to the controller 240 and/or the detector 230. The adaptor 231 may be installed in the housing 143a of FIG. 2. A connector 251 provided at a terminal of one side of the cable 250 is inserted into the adaptor 231 along a direction of an arrow. Therefore, the cable 250 and the adaptor 231 are connected each other. The connector 251 comprises a Radio Frequency Identification (RFID) chip 252. Also, a reader 232 to read data stored in the RFIP chip 252 is provided in an adapter side of the portable communication terminal apparatus 143 through the adaptor 231. The other side of the cable 250 is connected to the router 120 through the hub 130 or 140 to connect the portable communication terminal apparatus 143 to the Internet or a wired or wireless network.

In FIG. 3, the data stored in the RFID chip 252 is the cable identifying information which is capable of identifying the cable 250. Here, the cable 250 and the adaptor 231 may be connected electrically or optically. Meanwhile, the cable identifying information is detected by the RFID method in FIG. 3, but this is only an example and the cable identifying information may be detected by a contact method or a non-contact method.

As described above, if the cable 250 and the adaptor 231 are connected each other, the reader 232 detects the connection therebetween. Then, the reader 232 may further detect whether a terminal of the other side of the cable 250 is practically connected to the router 120 or the hub B 140, etc.

Also, a length of the cable 250 may be measured to be used as the information on the cable 250. The measuring method of the length of the cable 250 is known and the present general inventive concept may use the known method to make a map like table 2.

TABLE 2

| Length information of cable | IP address | Subnet mask | Router address | DNS server address |
|---|---|---|---|---|
| 20 | 10.0.0.2 | 255.255.255.0 | 10.0.0.1 | 10.2.2.10 |
| 30 | 10.0.0.3 | 255.255.255.0 | 10.0.0.1 | 10.2.2.10 |
| 40 | 10.0.0.4 | 255.255.255.0 | 10.0.0.1 | 10.2.2.10 |

Also, the present general inventive concept may use other methods as well as the above method, for example, a Media Access Control (MAC) address information of the router 120 may be used as the information on the cable 250.

The controller 240 generally controls operation of the portable communication terminal apparatus 143. Furthermore, the controller 240 comprises an address setting part 242 and a router address processor 244 to set the IP address.

The address setting part 242 sets the internet setting information comprising the IP address by using the information on the cable 250 detected in the detector 230. In other words, if 20 is detected as the length information of the cable in table 1 or C2 is detected as the cable identifying information in table 2, the address setting part 242 sets the corresponding IP address '10.0.0.2', subnet mask '255.255.255.0', router address '10.0.0.1' and DNS server address '10.2.2.10'

The router address processor 244 transmits a request message for Address Resolution Protocol (ARP) for the router address among the Internet connection information in the storage 220 to the router 120 and receives a corresponding response message to determine which subnet a current user is located in. In other words, if the portable communication terminal apparatus 143 is connected to the Internet network 110, the router address processor 244 reads the router address in the Internet connection information stored in the storage 220 and transmits the ARP requesting message to the router address. Next, if the router address transmitted from the portable communication terminal apparatus 143 is identical to the router address set in the router 120, the router 120 transmits the corresponding response message to the portable communication terminal apparatus 143. If the router address transmitted from the portable communication terminal apparatus 143 is not identical to the router address set in the router 120, the portable communication terminal apparatus 143 transmits a next router address which is stored in the storage 220 to the router 120.

Otherwise, the router address processor 244 receives a router advertisement message which is periodically transmitted from the router 120 and compares the router address in the received router advertisement message with the router address in the storage 220 so as to determine which subnet the portable communication terminal apparatus 143 is located in.

Figure 4:
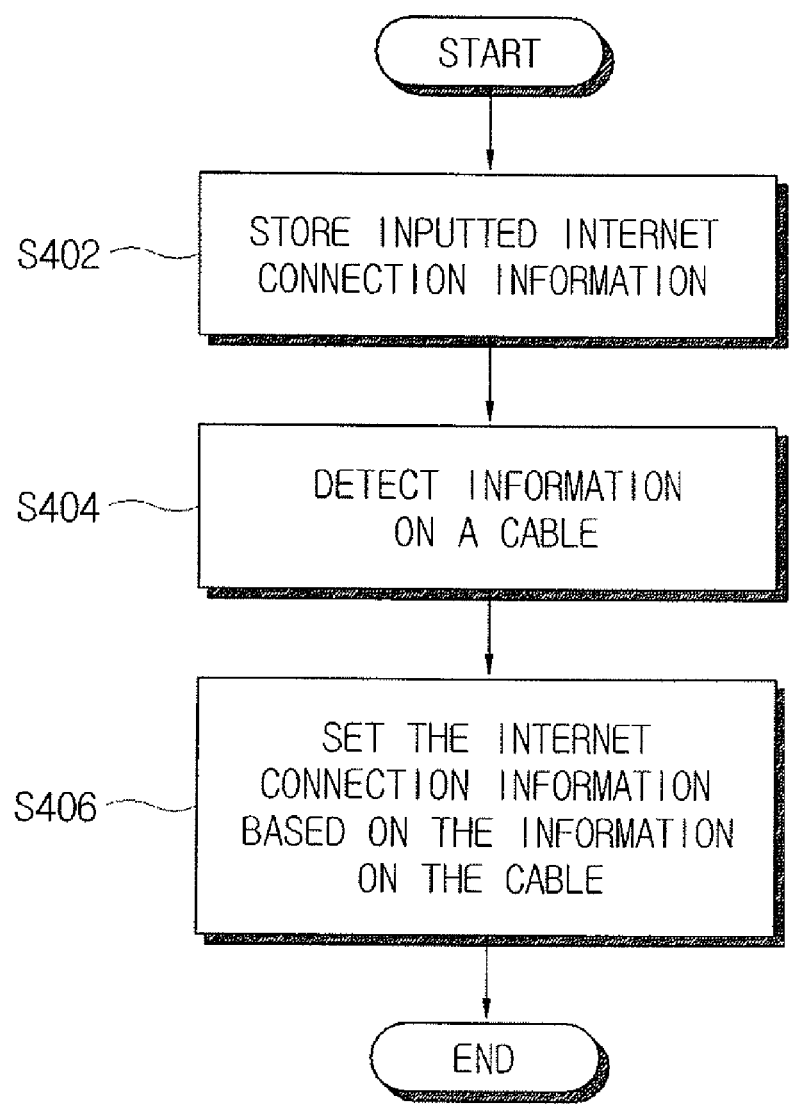
FIG. 4 is a schematic flow chart of a network address setting method of a portable communication terminal apparatus according to an exemplary embodiment of the present general inventive concept.
Figure 5:
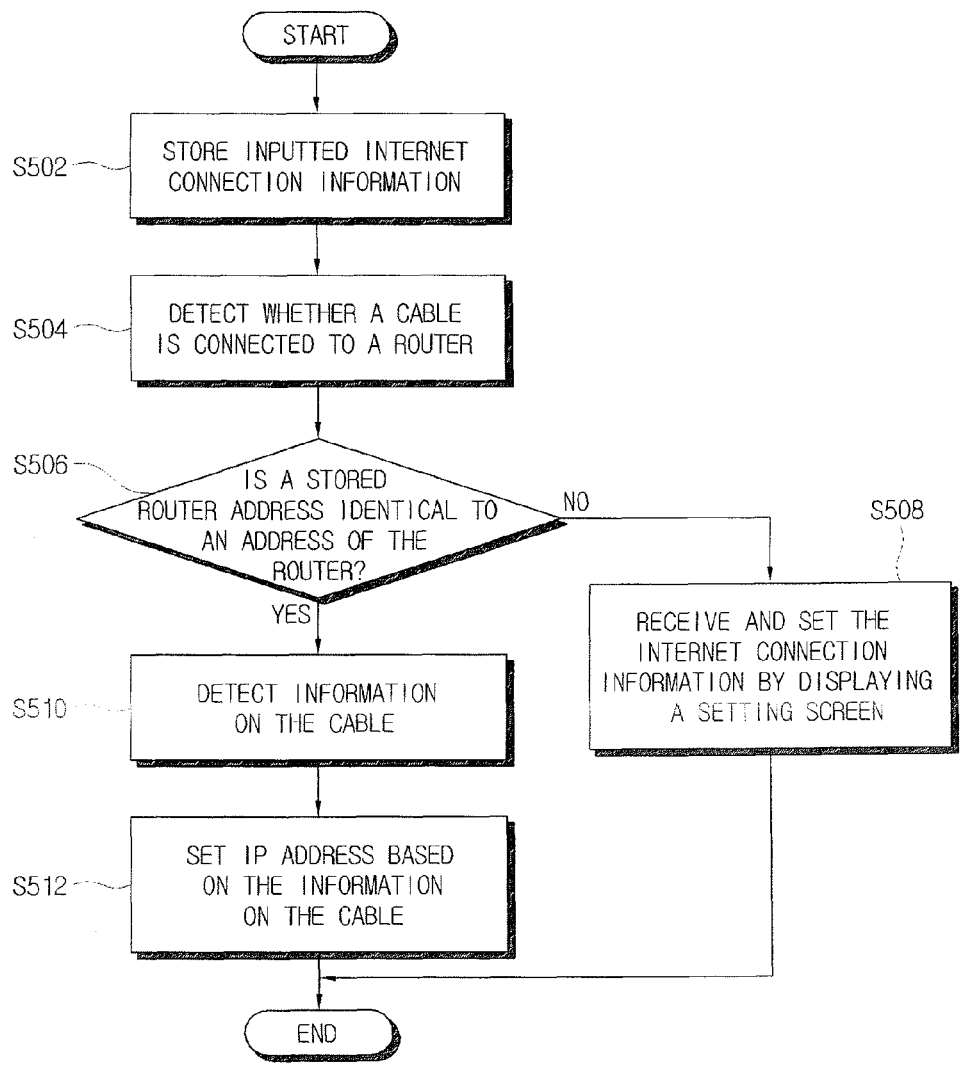
FIG. 5 is a detailed flow chart of a network address setting method of a portable communication terminal apparatus according to an exemplary embodiment of the present general inventive concept.

Referring to FIGS. 2-4, the controller 240 in the portable communication terminal apparatus 143 displays a screen on the display 214 to receive the Internet connection information. In other words, the controller 240 displays the input items about the IP address, the subnet mask, the router address and the DNS server address on the display 214. The user inputs respective information allotted by a network manager to the respective input items displayed on the display 214 through the user input part 212. The controller 240 stores the inputted Internet connection information in the storage 220 at operation S402.

If the portable communication terminal apparatus 143 is connected to the cable 250, the detector 230 detects the information on the cable 250 at operation S404.

Then, the detector 230 transmits the information on the cable 250 to the controller 240. The address setting part 242 in controller 240 searches the Internet connection information, i.e., the IP address, and so on corresponding to the detected information on the cable 250 in the plurality of Internet connection information stored in the storage 220. Then, if the Internet connection information corresponding to the detected information on the cable 250 exists, the address setting part 242 sets the Internet connection information at operation S406.

Referring to FIGS. 2-5, the controller 240 in the portable communication terminal apparatus 143 displays a screen on the display 214 so as to receive the Internet connection information. In other words, the controller 240 displays the input items about the IP address, the subnet mask, the router address and the DNS server address on the display 214. The user inputs respective information to the input items displayed on the display 214 through the user input part 212. The controller 240 stores the inputted Internet connection information in the storage 220 at operation S502. The user selects a function to automatically set the IP address after storing the information for automatically setting the IP address.

If the portable communication terminal apparatus 143 is turned on, the controller 240 determines whether the function to automatically set the IP address is selected or not. Next, the controller 240 detects whether the cable 250 connected to the portable communication terminal apparatus 143 is also connected to the router 120 or not to determine whether the communication is available or not at operation S504.

The router address processor 244 transmits the ARP requesting message according to the router address among the information stored in the storage 220 to the router 120. The router 120 transmits the response message with respect to the ARP requesting message. The router address processor 244 processes the received response message so that the router address processor 244 gets to know which subnet the user is located in. If the address of the router 120 connected to the portable communication terminal apparatus 143 is identical to one of the router addresses in the storage 220 at operation S506, the router address processor 244 sets the identical router address as a standard router address.

Otherwise, if the address of the router 120 connected to the portable communication terminal apparatus 143 is not identical to one of the router addresses in the storage 220, the controller 240 determines that the user moves to a new subnet or a new communication terminal apparatus number which is not assigned previously. Then, the controller 240 displays a network setting screen as a user interface on the display 214 and sets the network by receiving the Internet connection information from the user at operation S508.

If the standard router address, i.e., the subnet address, is set, the router address processor 244 transmits the information on the subnet address to the address setting part 242. Then, the address setting part 242 detects the information on the cable 250 connected to the router 120 from the detector 230 at operation S510.

If the information on the cable 250 connected to the router is detected, in other words, if the cable identifying information, the cable length information or the MAC address is detected, the address setting part 242 automatically sets the IP address by determining the IP address corresponding to the information on the cable 250 in the subnet address.

The present general inventive concept can also be embodied as computer-readable codes on a computer-readable medium. The computer-readable medium may include a computer-readable recording medium and a computer-readable transmission medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable transmission medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, the present general inventive concept automatically sets the network address in the Internet environment in which the present invention is frequently moved.

Also, the present general inventive concept automatically sets the network address by using the information on the cable 250 connected to the portable communication terminal apparatus 143.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A portable communication terminal apparatus which is connected through a cable to a router, where the router is connected to a communication system, the apparatus comprising:
   a storage which stores a plurality of allocated Internet Protocol (IP) addresses;
   a detector which detects information on the cable by detecting the cable connected to the router, and which detects cable identifying information stored in a chip that is provided on the cable; and
   an address setting part which sets an IP address, among the plurality of IP addresses, corresponding to the detected information on the cable and the detected cable identifying information, as the network IP address.

2. The portable communication terminal apparatus of claim 1, wherein the detector comprises a Radio Frequency Identification reader which is capable of reading an attached wireless IC tag as the identifying information.

3. The portable communication terminal apparatus of claim 1, the detector measures a length of the cable as the detected information on the cable.

4. The portable communication terminal apparatus of claim 1, wherein the detector detects whether the cable is connected to the router.

5. The portable communication terminal apparatus of claim 4, wherein the storage stores a table comprising the detected information on the cable and the Internet Protocol address corresponding to the cable.

6. The portable communication terminal apparatus of claim 5, wherein the table in the storage further comprises one or more router addresses, the apparatus further comprising a router address processor which processes whether the connected router address is identical to one of the stored router addresses if the cable is connected between the router and the portable communication terminal apparatus.

7. The portable communication terminal apparatus of claim 6, wherein the address setting part sets the network IP address corresponding to the detected information on the detected cable, if the connected router address is identical to one of the stored router addresses and the detected information on the cable is stored.

8. The portable communication terminal apparatus of claim 6, wherein the address setting part outputs a setting screen to receive a new IP address if the connected router address is not identical at least one of the stored router addresses.

9. A communication system which connects a router and a portable communication terminal apparatus through a cable, wherein the portable communication terminal apparatus comprises:
- a storage which stores a plurality of allocated Internet Protocol (IP) addresses;
- a detector which detects information on the cable connected to the router, and which detects cable identifying information stored in a chip that is provided on the cable; and
- an address setting part which sets an IP address, among the plurality of IP addresses, corresponding to the detected information on the cable and the detected cable identifying information, as the network IP address.

10. A network address setting method of a portable communication terminal apparatus connected to a router through a cable, the method comprising:
- storing a plurality of allocated Internet Protocol (IP) addresses;
- detecting information on the cable connected to the router and detecting cable identifying information stored in a chip that is provided on the cable; and
- setting an IP address, among the plurality of IP addresses, corresponding to the detected information on the cable and the detected cable identifying information, as a network IP address.

11. The network address setting method of claim 10, wherein the detecting comprises measuring a length of the cable as the detected information on the cable.

12. The network address setting method of the portable communication terminal apparatus according to claim 10, wherein the detecting comprises a Media Access Control address of the router as the detected information on the cable.

13. The network address setting method of claim 10, wherein the detecting comprises detecting whether the cable is connected between the router and the portable communication terminal apparatus.

14. The network address setting method of claim 13, wherein the storing comprises storing a table comprising the detected information on the cable and the IP address corresponding to the cable.

15. The network address setting method of claim 14, wherein the storing further comprises storing one or more router addresses, and further comprising processing whether the connected router address is identical to one of the stored router addresses if the cable is connected to the router.

16. The network address setting method of claim 15, wherein the setting as the network IP address comprises setting the network IP address corresponding to the detected information on the detected cable if the connected router address is identical to one of the stored router addresses and the detected information of the cable is stored.

17. The network address setting method of claim 15, wherein the setting as the network IP address comprises outputting a setting screen to receive a new IP address if the connected router address is not identical to at least one of the stored router addresses.

18. A network address setting method of a communication system comprising a router and a portable communication terminal apparatus, the method comprising:
- storing a plurality of allocated Internet Protocol (IP) addresses in the portable communication terminal apparatus;
- connecting the router and the portable communication terminal apparatus by the cable; and
- detecting information on the cable connected to the router and detecting cable identifying information stored in a chip that is provided on the cable, and setting an IP address, among the plurality of IP addresses, corresponding to the detected information on the cable and the detected cable identifying information, as a network IP address.

19. A portable communication terminal apparatus usable with a communication system, the apparatus comprising:
- a detector which detects information on an external cable and detects cable identifying information stored in a chip that is provided on the external cable; and
- a controller which sets a network IP address according to the detected information on the cable, the detected cable identifying information, and a plurality of reference allocated Internet Protocol addresses.

20. The portable communication terminal apparatus of claim 19, further comprising:
- a housing to accommodate the detector and the controller; and
- an adapter disposed on the housing to be connected to the external cable to read the detected information on the external cable.

21. The portable communication terminal apparatus of claim 20, further comprising:
- a user interface unit disposed in the housing and having a display and a user input part to display a screen and to input data using the displayed screen to correspond to at least one of the plurality of reference allocated Internet Protocol addresses.

22. The portable communication terminal apparatus of claim 19, wherein:
- the external cable is connectable to one of a first router and a second router; and
- the detector detects the detected information on a first router address when the external cable is connected to the first router, and detects the information on a second router address when the external cable is connected to the second router.

23. The portable communication terminal apparatus of claim 19, wherein the controller sets a new network IP address as the network IP address when the detected information on the cable does not match at least one of the plurality of reference allocated Internet Protocol addresses.

24. A network address setting method of a portable communication terminal apparatus connected to a router through a cable, the method comprising:

detecting information received by the portable communication terminal from the cable connected to the router and detecting cable identifying information stored in a chip that is provided on the cable; and setting an Internet Protocol (IP) address as a network IP address based on the detected information received from the cable, the detected cable identifying information, and one or more reference allocated IP addresses.

* * * * *